United States Patent
Willcox (10) Patent No.: US 9,316,553 B2
(45) Date of Patent: Apr. 19, 2016

(54) SPAN LINE PRESSURE EFFECT COMPENSATION FOR DIAPHRAGM PRESSURE SENSOR

(71) Applicant: Rosemount Inc., Chanhassen, MN (US)

(72) Inventor: Charles Ray Willcox, Chanhassen, MN (US)

(73) Assignee: Rosemount Inc., Chanhassen, MN (US)

( * ) Notice: Subject to any disclaimer, the term of this patent is extended or adjusted under 35 U.S.C. 154(b) by 98 days.

(21) Appl. No.: 14/225,763

(22) Filed: Mar. 26, 2014

(65) Prior Publication Data

US 2015/0276528 A1 Oct. 1, 2015

(51) Int. Cl.
*G01L 9/12* (2006.01)
*G01L 9/00* (2006.01)
*G01L 19/02* (2006.01)

(52) U.S. Cl.
CPC ............ *G01L 9/0072* (2013.01); *G01L 9/0041* (2013.01); *G01L 19/02* (2013.01)

(58) Field of Classification Search
CPC ... G01L 9/0072; G01L 13/025; G01L 9/0075; G01L 7/00; G01L 19/0084
USPC ............ 73/718, 716, 717, 724, 753, 715, 92, 73/90, 700
See application file for complete search history.

(56) References Cited

U.S. PATENT DOCUMENTS

| | | | | |
|---|---|---|---|---|
| 4,370,890 | A * | 2/1983 | Frick ..................... | G01L 13/025 361/283.4 |
| 4,905,575 | A | 3/1990 | Knecht et al. | |
| 5,477,738 | A | 12/1995 | Tobita et al. | |
| 6,295,875 | B1 * | 10/2001 | Frick ..................... | G01L 9/0072 73/718 |
| 7,308,830 | B2 | 12/2007 | Harasyn et al. | |
| 7,334,484 | B2 | 2/2008 | Harasyn et al. | |
| 7,412,893 | B2 * | 8/2008 | Hedtke ............... | G01L 19/0007 73/708 |
| 7,415,886 | B2 * | 8/2008 | Schumacher ......... | G01L 13/025 73/718 |
| 8,234,927 | B2 * | 8/2012 | Schulte ................ | G01L 9/0072 73/718 |
| 2006/0278007 | A1 * | 12/2006 | Harasyn ............... | G01L 13/025 73/723 |
| 2007/0169557 | A1 * | 7/2007 | Harasyn ............... | G01L 27/007 73/718 |
| 2010/0083768 | A1 * | 4/2010 | Hedtke ................ | G01L 27/007 73/724 |
| 2010/0132472 | A1 * | 6/2010 | Willcox ............... | G01L 23/125 73/718 |

(Continued)

FOREIGN PATENT DOCUMENTS

WO    WO 82/01250    4/1982
WO    WO 2006/130425    12/2006

OTHER PUBLICATIONS

Copy of Notification of Transmittal of the International Search Report and the Written Opinion of the International Searching Authority, PCT/US2015/012393, dated Apr. 28, 2015.

*Primary Examiner* — Lisa Caputo
*Assistant Examiner* — Nigel Plumb
(74) *Attorney, Agent, or Firm* — Westman, Champlin & Koehler, P.A.

(57) ABSTRACT

A differential pressure sensor for sensing a differential pressure of a process fluid, includes a sensor body having a sensor cavity formed therein with a cavity profile. A diaphragm in the sensor cavity deflects in response to an applied differential pressure. The diaphragm has a diaphragm profile. A gap formed between the cavity profile and the diaphragm profile changes as a function of the differential pressure. At least one of the cavity profile and diaphragm profile changes as a function of a line pressure to compensate for changes in the gap due to deformation of the sensor body from the line pressure.

21 Claims, 10 Drawing Sheets

(56) References Cited

U.S. PATENT DOCUMENTS

| | | | | |
|---|---|---|---|---|
| 2010/0132473 A1* | 6/2010 | Willcox | ............... | G01L 9/0029 73/722 |
| 2011/0239773 A1* | 10/2011 | Klosinski | ............... | G01L 9/0016 73/724 |
| 2012/0279580 A1* | 11/2012 | Hausler | ............... | G01L 19/0636 137/82 |

* cited by examiner

Diaphragm Surface Change with Line Pressure

FIG. 6

Cavity Change with Line Pressure

FIG. 7

Diaphragm Surface change with Line Pressure

FIG. 8

Combined Effective Cavity Change with Line Pressure

Deformed diaphragm with line pressure

FIG. 13B

Combined Effective Cavity Change with Line Pressure

SPAN LINE PRESSURE EFFECT COMPENSATION FOR DIAPHRAGM PRESSURE SENSOR

BACKGROUND

The present invention relates to pressure sensors of the type used to measure the pressure of a process fluid. More specifically, the present invention relates to compensating for inaccuracies in a differential pressure measurement due to a line pressure.

Transmitters are used in process monitoring and control systems to measure various process variables of industrial processes. One type of transmitter measures pressure of process fluid in the process. Various techniques have been utilized in pressure sensors used in such transmitters. One well known capacitive measuring technique is to use a deflectable diaphragm. A capacitance is measured between two opposing surfaces, with the diaphragm forming one of the capacitive plates of the capacitor and another fixed electrode typically attached to the body of the sensor forming the second capacitor plate. As the diaphragm is deflected due to applied pressure, the measured capacitance changes. In such a configuration, there are a number of sources of inaccuracies in pressure measurements.

One technique which addresses these inaccuracies is set forth in U.S. Pat. No. 6,295,875 entitled, "PROCESS PRESSURE MEASUREMENT DEVICES WITH IMPROVED ERROR COMPENSATION" issued Oct. 2, 2011 to Frick et al. which is incorporated herein by reference in its entirety. This patent describes a differential pressure sensor that includes an additional electrode for use in reducing measurement inaccuracies. However, in some instances a line pressure applied to the pressure sensor can introduce inaccuracies in the measured differential pressure.

SUMMARY

A differential pressure sensor for sensing a differential pressure of a process fluid, includes a sensor body having a sensor cavity formed therein with a cavity profile. A diaphragm in the sensor cavity deflects in response to an applied differential pressure. The diaphragm has a diaphragm profile. A gap formed between the cavity profile and the diaphragm profile changes as a function of the differential pressure. At least one of the cavity profile and diaphragm profile changes as a function of a line pressure to compensate for changes in the gap due to deformation of the sensor body from the line pressure.

DETAILED DESCRIPTION OF ILLUSTRATIVE EMBODIMENTS

As discussed in the Background section, one technique for measuring a differential pressure is to measure deflection of a diaphragm. The diaphragm is carried in a pressure sensor body. However, the absolute or gauge pressure (referred to herein as "line pressure") applied to the sensor body can cause deformation of the sensor body and lead to inaccuracies in the measured differential pressure. The present invention offers sensor configurations which compensate for these changes in the shape of the sensor body to thereby reduce such line pressure inaccuracies.

Figure 1:
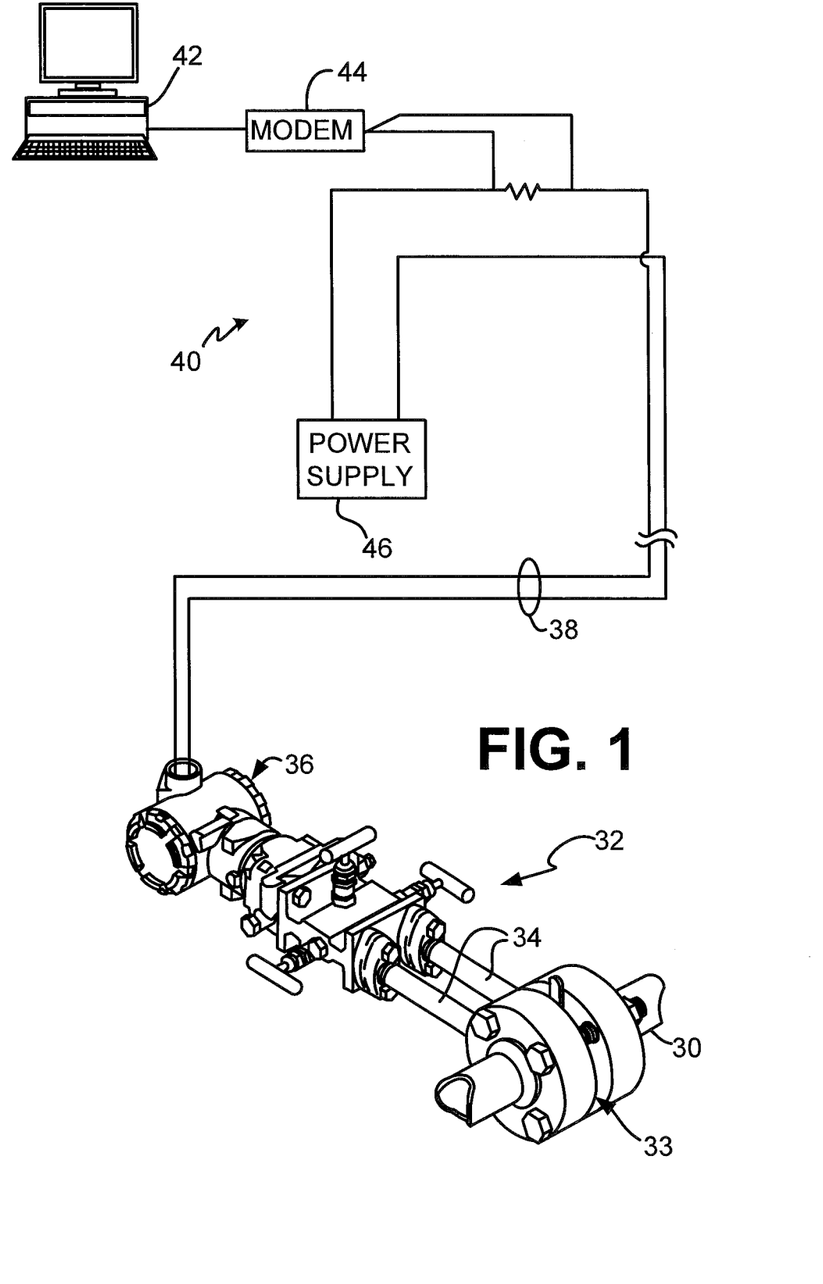
FIG. 1 shows a process measurement system with a process transmitter constructed in accordance with the present invention.

FIG. 1 shows generally the environment of a process measurement system 32. FIG. 1 shows process piping 30 containing a fluid under pressure coupled to the process measurement system 32 for measuring a process pressure. The process measurement system 32 includes impulse piping 34 connected to the piping 30. The impulse piping 34 is connected to a process pressure transmitter 36. A primary element 33, such as an orifice plate, venturi tube, flow nozzle, and so on, contacts the process fluid at a location in the process piping 30 between the pipes of the impulse piping 34. The primary element 33 causes a pressure change in the fluid as it passes past the primary element 33.

Transmitter 36 is a process measurement device that receives process pressures through the impulse piping 34. The transmitter 36 senses a differential process pressure and converts it to a standardized transmission signal that is a function of the process pressure.

A process control loop 38 provides both a power signal to the transmitter 36 from control room 40 and bidirectional communication, and can be constructed in accordance with a number of process communication protocols. In the illustrated example, the process loop 38 is a two-wire loop. The two-wire loop is used to transmit all power and communications to and from the transmitter 36 during normal operations with a 4-20 mA signal. A computer 42 or other information handling system through network interface 44 is used for communication with the transmitter 36. A remote voltage power supply 46 powers the transmitter 36. In addition to the loop configuration discussed above, process control loop 38 can also comprise any appropriate process control loop. Examples include the HART® communication protocol in which digital information is modulated on to a 4-20 mA current, the Foundation Fieldbus or Profibus communication protocols, etc. Process control loop 18 may also be implemented using wireless communication techniques. One example of wireless communication technique is the WirelessHART® communication protocol in accordance with IEC 62591. Other techniques may also be used including those implemented using Ethernet or optical fiber.

Figure 2:
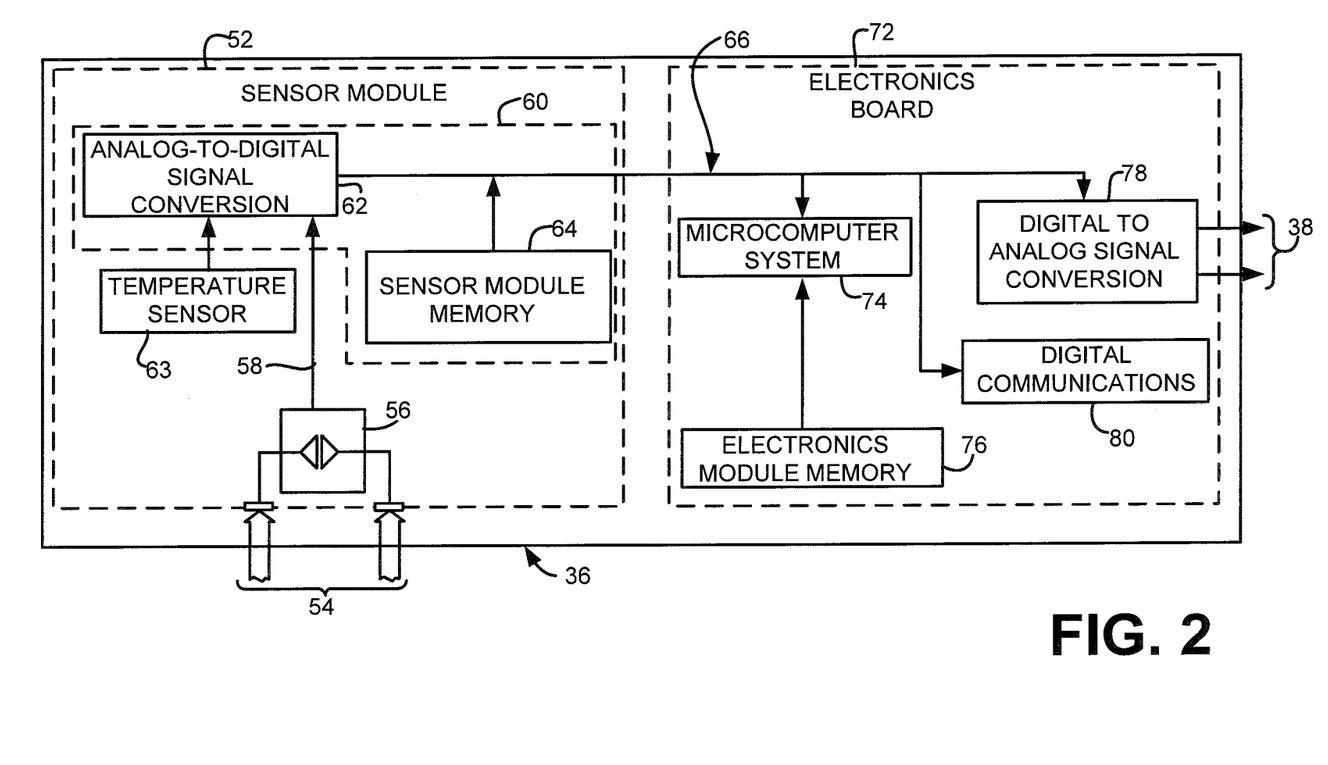
FIG. 2 is a schematic view of a transmitter of FIG. 1.

FIG. 2 is a simplified block diagram of pressure transmitter 36. Pressure transmitter 36 includes a sensor module 52 and an electronics board 72 coupled together through a databus 66. Sensor module electronics 60 couples to pressure sensor 56 which received an applied differential pressure 54. The data connection 58 couples sensor 56 to an analog to digital converter 62. An optional temperature sensor 63 is also illustrated along with sensor module memory 64. The electronics board 72 includes a microcomputer system 74, electronics memory module 76, digital to analog signal conversion 78 and digital communication block 80. In accordance with techniques set forth in U.S. Pat. No. 6,295,875 to Frick et al., pressure transmitter 36 measures differential pressure. However, the present invention is not limited to such a configuration.

Figure 3:
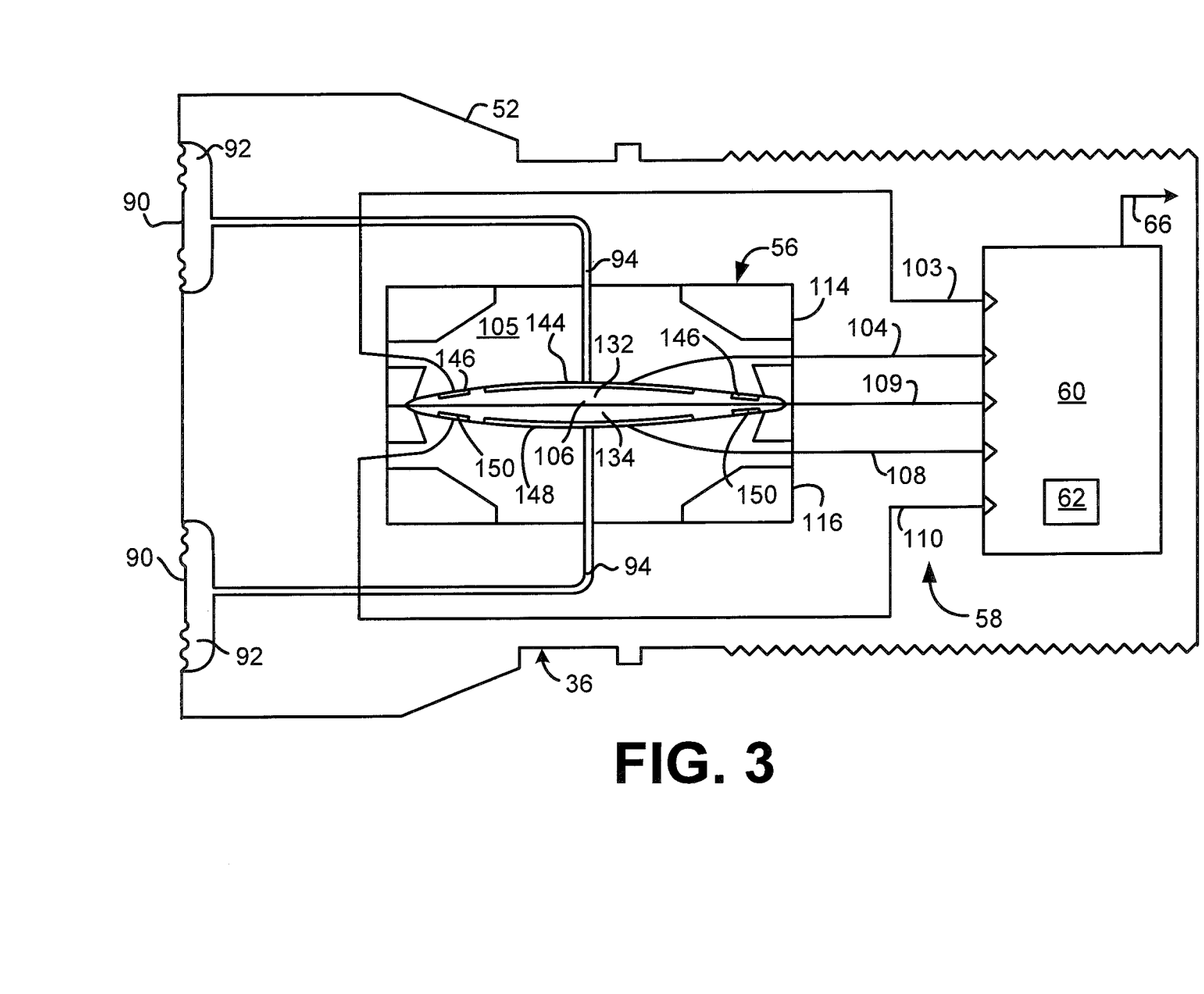
FIG. 3 shows a cross sectional view of a portion of the process transmitter of FIG. 1.

FIG. 3 is a simplified cross-sectional view of one embodiment of a sensor module 52 showing pressure sensor 56. Pressure sensor 56 couples to a process fluid through isolation diaphragms 90 which isolate the process fluid from cavities 92. Cavities 92 couple to the pressure sensor module 56 through impulse piping 94. A substantially incompressible fill fluid fills cavities 92 and impulse piping 94. When a pressure from the process fluid is applied to diaphragms 90, it is transferred to the pressure sensor 56.

Pressure sensor 56 is formed from two pressure sensor halves 114 and 116 and filled with a preferably brittle, substantially incompressible and electrically insulating material 105. A diaphragm 106 is suspended within a cavity 132,134 formed within the sensor 56. An outer wall of the cavity 132, 134 carries electrodes 146,144,148 and 150. These can, generally, be referred to as primary or main electrodes 144 and 148, and secondary electrodes 146 and 150. These electrodes form capacitors with respect to the moveable diaphragm 106. The capacitors, again, can be referred to as primary or main and secondary or ring capacitors.

As illustrated in FIG. 3, the various electrodes in sensor 56 are coupled to analog to digital converter 62 over electrical connection 103, 104, 108 and 110. Additionally, the deflectable diaphragm 106 couples to analog to digital converter 62 through connection 109. As discussed in U.S. Pat. No. 6,295,875, the differential pressure applied to the sensor 56 can be measured using the electrodes 144-150. As used herein, a "sensor body" is formed by sensor halves 114, 116. A "sensor cavity" is formed by regions 132 and 134. The term "cavity profile" refers to the shape of a cavity 132 or 134. In the specific configuration shown in FIG. 3, the electrodes 144, 146, 148 and 150 are carried on the cavity profile. The term "diaphragm profile" refers to the shape of diaphragm 106. The term "gap" refers to a distance between a point on the diaphragm profile and a point on a cavity profile. Note that the size of this gap changes radially due to the curvature of the cavity profile, any deflection of the diaphragm 106, as well as any deformation in the shape of the cavity profile due to deformation of the sensor body 114, 116.

In capacitance-based pressures sensors, a span line pressure inaccuracy occurs because the cavity expands as the line pressure is applied. This increase in cavity size reduces the effective span of the sensor creating a line pressure inaccuracy. As a consequence, capacitance-based sensors, particularly those incorporating free-edge diaphragms, suffer from uncompensated span line pressure effects.

Figure 4A:
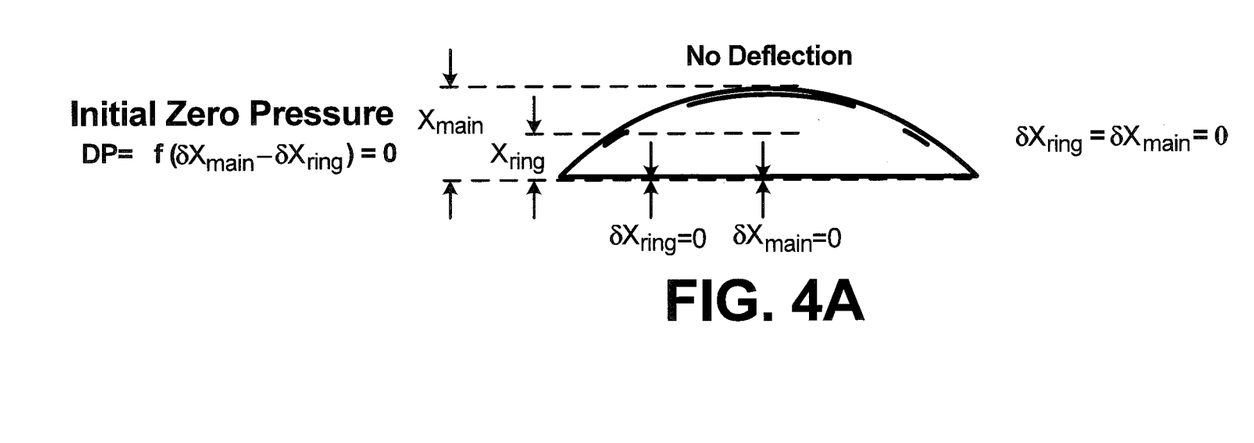
FIGS. 4A, 4B and 4C are side cross-sectional views of a diaphragm and sensor gap illustrating the application of a differential pressure and parallel-plate displacement (FIG. 4C).
Figure 4B:
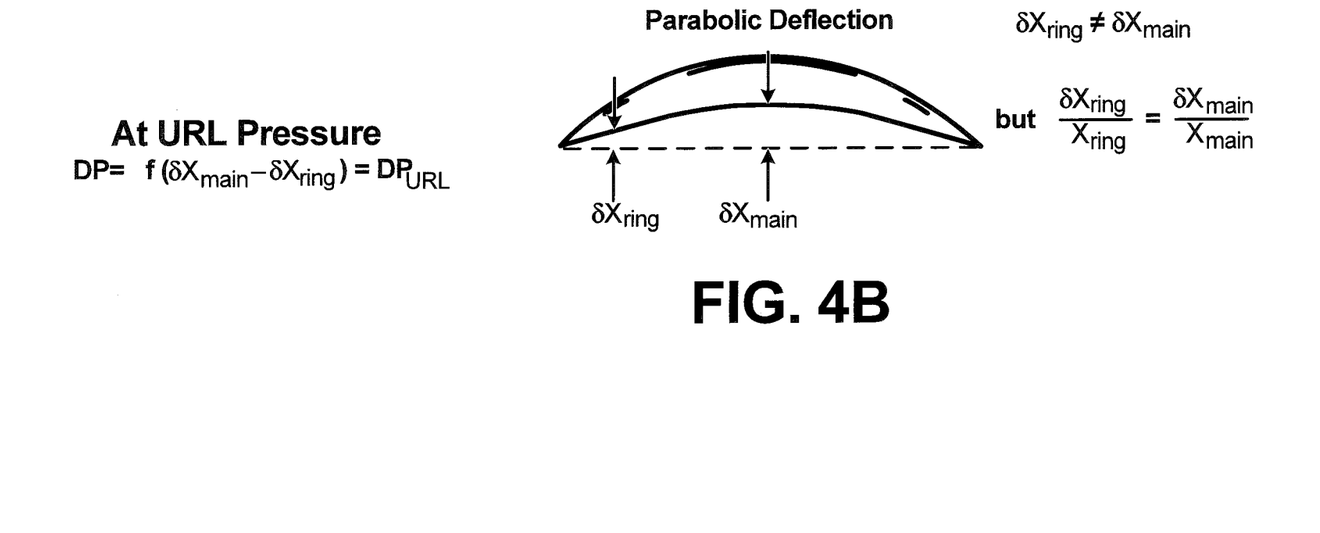

In order to understand how span line pressure inaccuracies can be corrected in free-edge diaphragm capacitance sensors, the following discussion briefly reviews how the sensor (incorporating a ring electrode) shown in FIG. 3 functions under various pressure situations. Consider a transfer function, denoted by $T_f$, having an output proportional to the applied differential pressure (DP) which depends on the difference between the gap change at the center of the cavity ($\delta X_{main}$), where the main electrode is located, and the gap change at an outer radius ($\delta X_{ring}$) where the ring electrode is located. FIGS. 4A and 4B illustrate how the main and ring gaps vary with applied DP. Note that the fractional changes in ring and main gaps will scale, i.e., are equal, whenever the cell cavity curvature follows the same shape as the diaphragm curvature under DP. Their absolute values, however, are different, which is how the DP measurement is made.

In more detail, consider FIG. 4A, which shows the diaphragm with no pressure applied. Since the ring and main deflections are zero, the transfer function will also be zero. Next, consider the case shown in FIG. 4B, where a differential pressure is applied to the diaphragm. Here, the diaphragm deflects with a parabolic shape. Since the absolute deflections at the main and ring positions are different, the transfer function output will be nonzero, with a value proportional to the applied DP pressure.

Figure 4C:
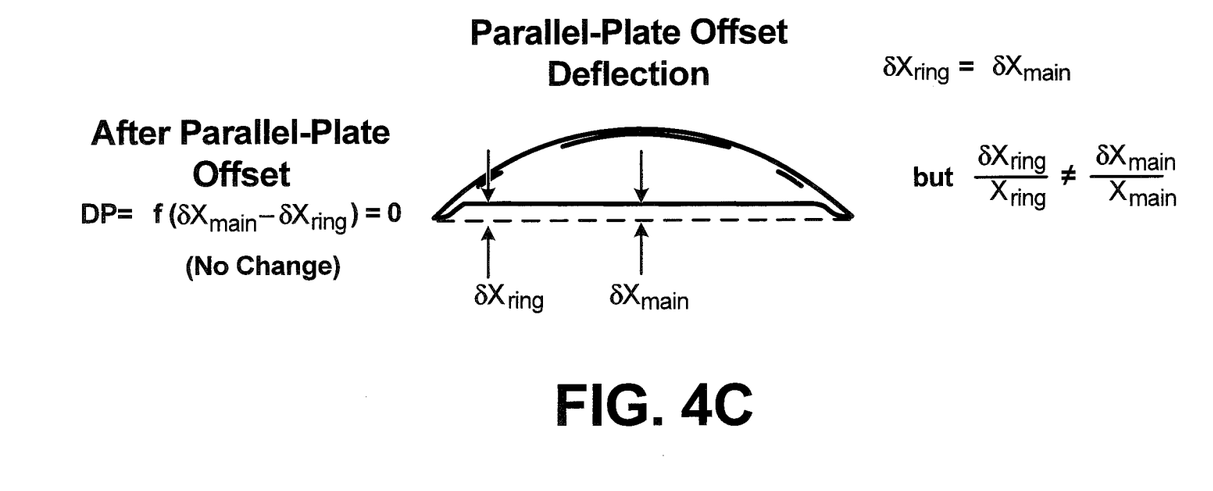
Figure 5:
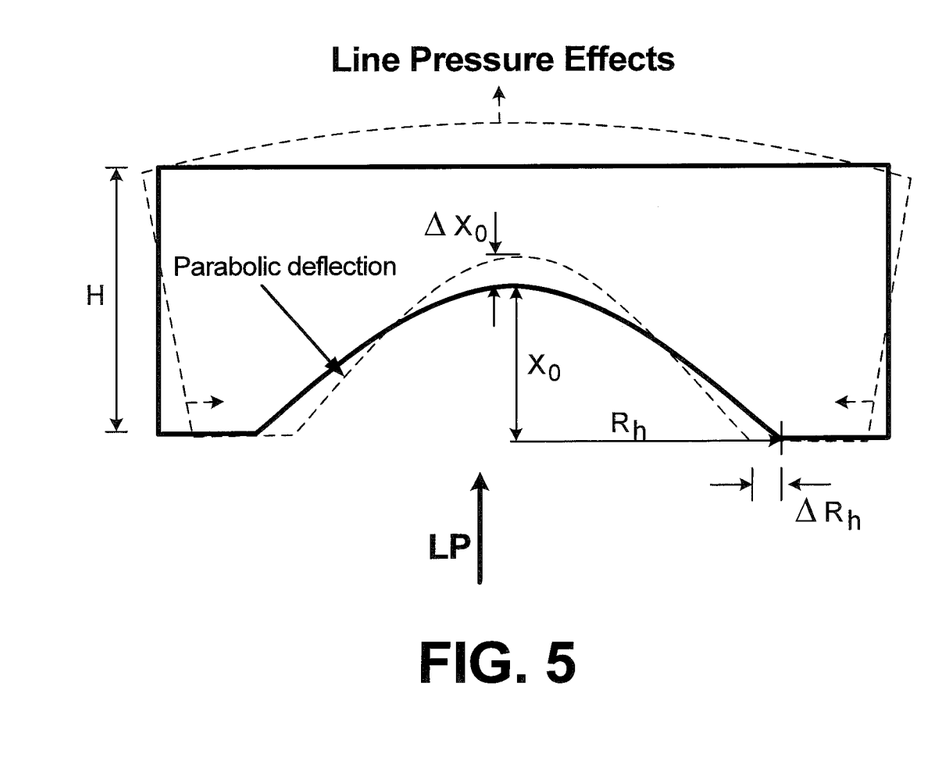
FIG. 5 is a cross-sectional view illustrating the effects of line pressure on a pressure sensor body.

Now consider the case shown in FIG. 4C, where the diaphragm has a flat offset over the capacitance sensing regions such that the measured gap displacements at the center and ring locations are the same. Consequently, for the transfer function discussed above, the output will not change. In other words, the transfer function $T_f$ is invariant whenever the gap displacements are the same over the main and ring electrodes. This type of deflection will heretofore be referred to as a "parallel-plate" displacement.

It can be shown that the following transfer defined by Equation 1 has the desired properties of the above described transfer function $T_f$, i.e., it responds to differential pressure, but is invariant to equal ring and main gap displacements. In teens of capacitance values, it is defined by:

$$T_f \equiv \frac{(C_{main}^L - A_L C_{ring}^L) - (C_{main}^H - A_H C_{ring}^H)}{(C_{main}^L - A_L C_{ring}^L) + (C_{main}^H - A_H C_{ring}^H)} \qquad \text{EQ. 1}$$

In Equation 1, L and H refer to the Low and High pressure sides respectively, and A is a gain factor chosen to satisfy the desired invariance property described above. That is, its magnitude is selected such that the main active capacitance change equals that of the ring capacitance change times a fixed gain factor A, whenever the gap changes at the main and ring electrode locations have the same magnitude. For capacitance-based sensor designs, a problem lies with the cavity depth increase as line pressure increases, which tends to reduce the span. This effect becomes problematic particularly at high line pressures. Mathematically, the cavity depth as function of radius (r) obeys a parabolic law, $$X_{Cell}(r) \approx X_0 \left(1 - \frac{r^2}{R_h^2}\right) \qquad \text{EQ. 2}$$

where $R_h$ is the outer cavity (hinge-point) radius and $X_o$ is the cavity depth at the center. At the center (radius=0) we will denote the cavity change with LP by $\Delta X_o$. The net cavity depth as a function of radius and LP can then be described by:

$$X_{Cell}(r, LP) \approx X_0\left(1 - \frac{r^2}{R_h^2}\right) + \Delta X_0\left(1 - \frac{r^2}{R_h^2}\right) \qquad \text{EQ. 3}$$

Next we denote the change in gap with radius and LP by $\delta^c_{LP}$ and defined by:

$$\delta^C_{LP}(r, LP) \equiv \Delta X_0\left(1 - \frac{r^2}{R_h^2}\right) \qquad \text{EQ. 4}$$

so that Equation 3 can be rewritten as:

$$X_{Cell}(r, LP) \approx X_0\left(1 - \frac{r^2}{R_h^2}\right) + \delta^C_{LP}(r, LP) \qquad \text{EQ. 5}$$

For a properly designed sensor cell body, the cavity change denoted by $\delta^c_{LP}$ will also vary approximately like a parabola and is dependent on both r and LP. Because the radial dependence of $\delta^c_{LP}$ is parabolic, the line pressure-induced cavity change will appear like a DP change. Hence, the transfer function cannot distinguish this LP change from a real DP change and consequently, the LP effect will cause an inaccuracy in the output.

Now contrast this with a cavity change caused by a "parallel-plate" offset δ, namely $$X_{Cell}(r) \approx X_0\left(1 - \frac{r^2}{R_h^2}\right) + \delta \qquad \text{EQ. 6}$$

Note that δ is independent of r. Thus, it is possible to subtract a new term from Equation 5 in order to cancel the radial dependence in $\delta^c_{LP}$ making the net displacement term independent of r; however, it can still vary with LP.

Denote this desired function by $\delta^c_{LP}$ so that Equation 5 becomes:

$$X_{Cell}(r, LP) \approx X_0\left(1 - \frac{r^2}{R_h^2}\right) + \delta^C_{LP}(r, LP) - \delta^D_{LP}(r, LP) \qquad \text{EQ. 7}$$

Consequently, the identity we seek is of the form:

$$\delta_{LP}^C(r, LP) - \delta_{LP}^D(r, LP) = \delta_{LP}(LP) \qquad \text{EQ. 8}$$

where $\delta_{LP}$ only depends on LP and not on the radius r.
By inspection:

$$\delta^D_{LP}(r, LP) = -\Delta X_0\left(\frac{r}{R_h}\right)^2 \qquad \text{EQ. 9}$$

So that $\delta_{LP}$ becomes simply:

$$\delta_{LP}(LP) = \Delta X_0 \qquad \text{EQ. 10}$$

which satisfies the desired requirement (i.e., is independent of r).

Figure 6:
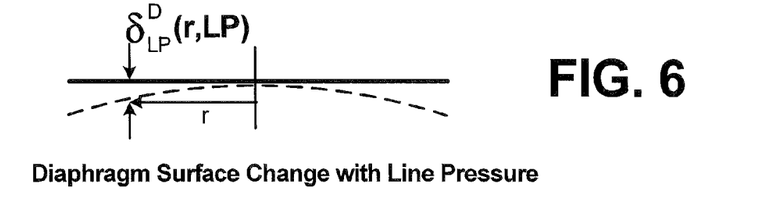
FIGS. 6 and 8 is a diagram illustrating a surface change of a diaphragm with applied line pressure.
Figure 7:
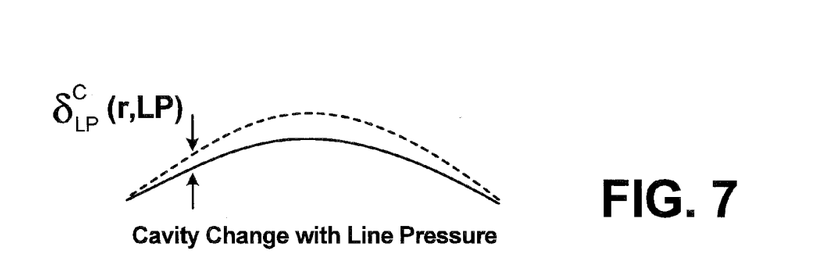
FIG. 7 is a diagram illustrating a change in a cavity profile of a pressure sensor with applied line pressure.
Figure 8:
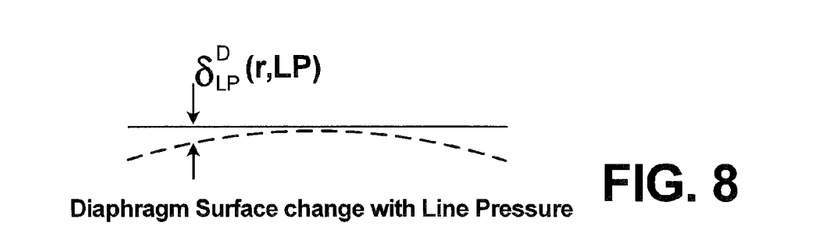
Figure 9:
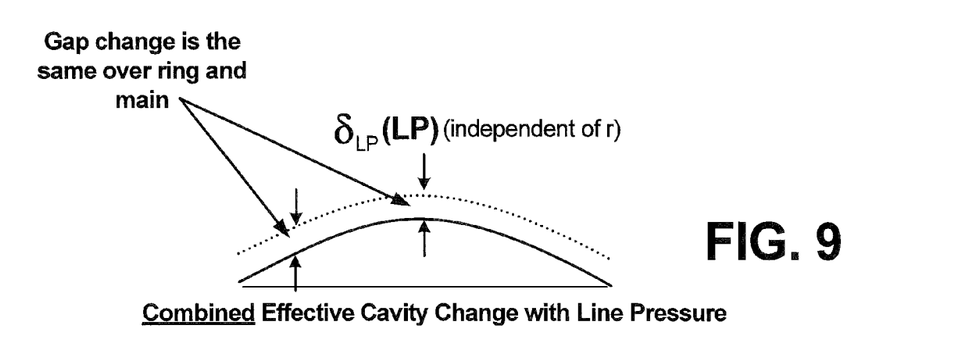
FIG. 9 is a diagram showing the combined effect of the diaphragm surface change and cavity shape change with applied line pressure.

Graphically, $\delta^D_{LP}$ varies with the radius r as shown in FIG. 6. The combined effect of subtracting $\delta^D_{LP}$ from $\delta^C_{LP}$ produces an effective change in gap that is independent of radius, varying only with LP. This is illustrated in FIGS. 7, 8 and 9.

Notice how the combined changes in cell cavity and diaphragm yield a net fixed offset in the cavity that does not vary with radius. This means that the capacitance change, which depends only on the gap, will be the same for any location within the cavity, and in particular, at either the main or ring electrode locations. Hence, the modified sensor will change with LP in a fashion that appears to the transfer function like a parallel-plate offset and consequently will not change. Thus, this yields a sensor that is invariant to LP effects.

Figure 10:
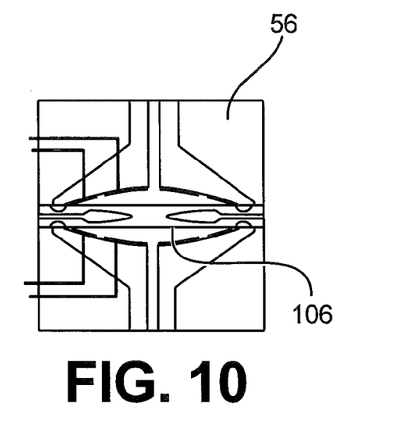
FIG. 10 is a side cross-sectional view illustrating a pressure sensor including a diaphragm having an internal cavity.
Figure 11:
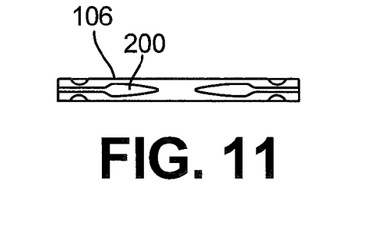
FIG. 11 is an enlarged cross-sectional view of the diaphragm of FIG. 10.
Figure 12:
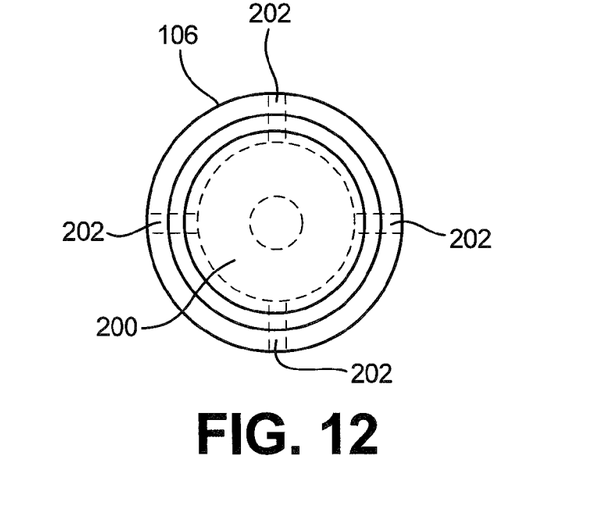
FIG. 12 is a top plan view of the diaphragm of FIG. 10.
Figure 13A:
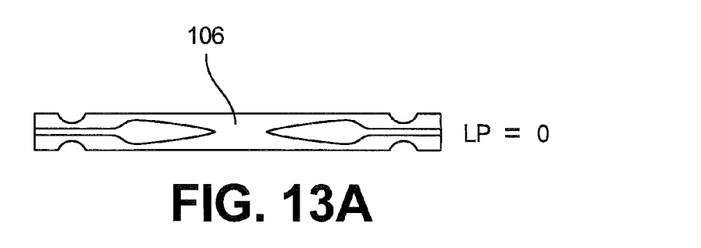
FIGS. 13A and 13B illustrate the application of a line pressure and its effect on diaphragm shape.
Figure 13B:
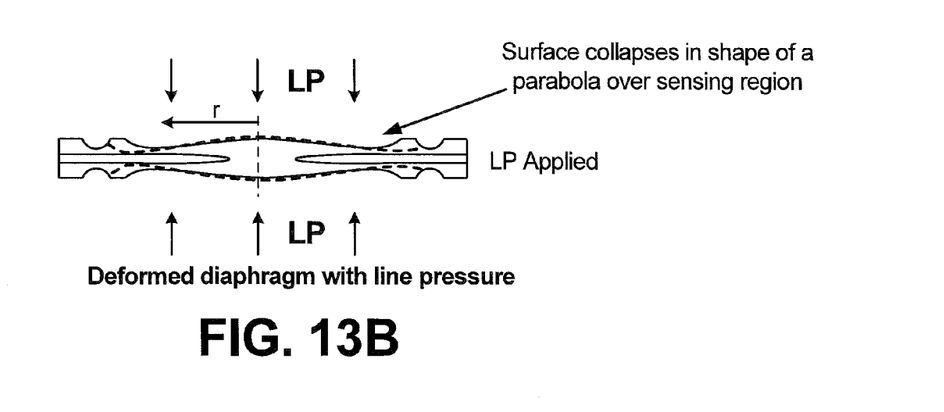
Figure 14:
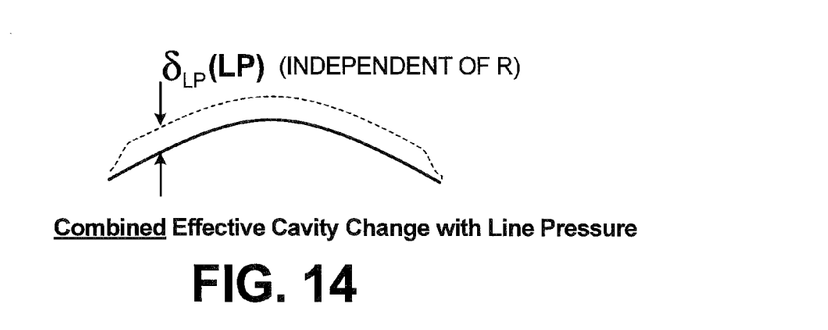
FIG. 14 is a diagram illustrating the combined effect of cavity shape change with line pressure.

The desired changes in the gap profile discussed above can be achieved through any desired configuration. In specific example embodiments, the changes are achieved by modifying the diaphragm, the sensor body, or both the diaphragm and sensor body. FIG. 10 is an enlarged cross-sectional view of sensor body 56 including a diaphragm 106 in accordance with one example embodiment of the present invention. FIG. 11 is a cross-section view of diaphragm 106 and FIG. 12 is a top plan view of diaphragm 106. Diaphragm 106 includes a diaphragm deformation cavity 200 shown in FIG. 11. As illustrated in FIG. 12, a plurality of vent ports 202 provide venting to the diaphragm deformation cavity 200 of diaphragm 106. Typically, these vent ports 202 are vented to atmospheric pressure, however the invention is not limited to such a configuration. In this configuration, the diaphragm 106 is configured to change shape in a parabolic fashion as line pressure is applied. Specifically, FIG. 13A is a cross-sectional view of diaphragm 106 with no line pressure applied. However, as illustrated in FIG. 13B, as a line pressure is applied notice how the deflection follows the desired parabolic shape over the sensing regions (i.e., main and ring) as required for $\delta^D_{LP}$ as shown by the dashed line. When this diaphragm is combined with the cell half, the combined change in cavity depth will be independent of radius and will only depend on line pressure over the ring and main sensing locations. This is illustrated in FIG. 14. Therefore, this modified diaphragm 106 yields gap changes at ring and main electrode locations that are equal. Consequently, if used with the transfer function discussed above, the output will become independent of line pressure.

Figure 15:
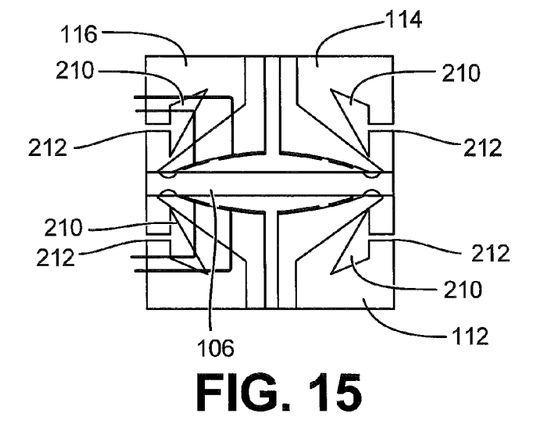
FIG. 15 is a side cross-sectional view of another embodiment of the pressure sensor including cavities within the sensor body.

FIG. 15 illustrates another example embodiment of the present invention. In FIG. 15, the body 114, 116 of sensor 56 includes sensor body deformation cavity 210 formed therein. These are coupled to an external pressure through vent ports 212. This pressure may, for example, be atmospheric, however the invention is not limited to this configuration. In FIG. 15, the diaphragm 106 is illustrated as a standard free-edge diaphragm.

Figure 16A:
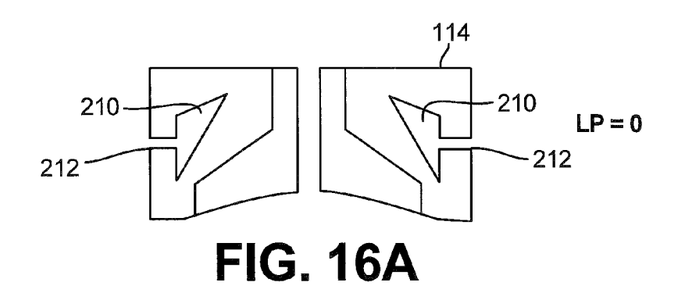
FIGS. 16A and 16B are cross-sectional views of a half cell of the pressure sensor illustrating the effects of applied line pressure on the shape of the sensor half cell.
Figure 16B:
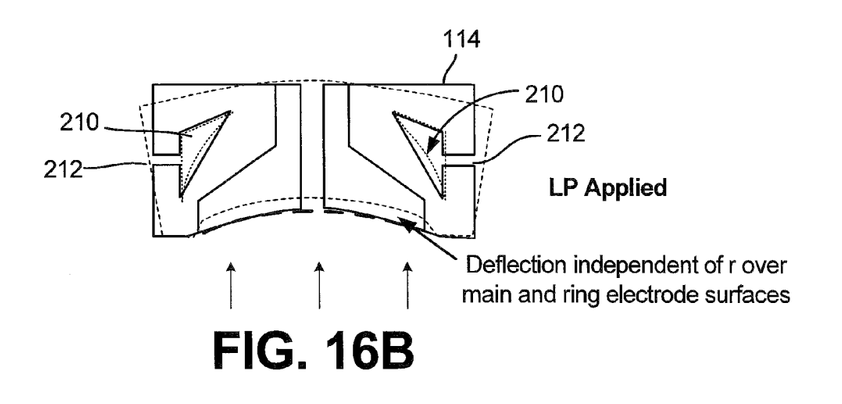

FIG. 16A shows a half cell 114 of sensor 56 when no line pressure is applied. As illustrated in FIG. 16B, when a line pressure is applied the sensor body deformation cavity 210 deforms such that the gap change with line pressure is independent of radius.

The above configurations allow for greatly reduced span inaccuracies in differential pressure measurements due to applied line pressures. For example, with a line pressure of 100 psi, the improved accuracy can easily exceed a factor 10.

The fabrication of the sensor body 114, 116 and/or diaphragm 106 can be in accordance with any desired technique. One specific fabrication technique includes the use of 3D printing technology including the printing of metal or insulating materials. 3D printing techniques allow the fabrication of cavities within metal or insulating structures as desired.

Although the present invention has been described with reference to preferred embodiments, workers skilled in the art will recognize that changes may be made in form and detail without departing from the spirit and scope of the invention. Although specific cavity configurations are illustrated in the diaphragm and sensor body, other configurations may also be used. The cavities may include material which deforms or otherwise changes shapes, or may include a gas or air. Any number of cavity or cavity configurations may be employed. The cavity configurations may be used only in the sensor body, only in the diaphragm, or in both the sensor body and the diaphragm. Although cavities are discussed above, the invention includes a sensor body and/or diaphragm in which the rigidity of the sensor body/diaphragm changes with respect to radius in a manner to achieve a gap profile which is relatively independent of applied line pressure. As used herein, the term "cavity" includes such a configuration. In various aspects, the invention provides a diaphragm having a surface profile which varies radially, and in one specific embodiment radially in a parabolic shape. In one configuration, the internal deformation cavity of the diaphragm and/or sensor generally enlarges in a radial direction. The diaphragm can be fabricated from a metal, ceramic, a combination or other material. One specific fabrication technique includes the use of 3D printing technology. In another aspect, the invention provides a sensor body having a cavity formed therein. A cavity profile of the sensor body varies radially, and in one specific embodiment in a parabolic shape. In one configuration, the size of the deformation cavity increases in a radial direction. The sensor body can be formed of a metal, insulator, a combination thereof, or other materials. In a specific configuration, the sensor body is fabricated using 3D printing technology.

What is claimed is:

1. A differential pressure sensor for sensing a differential pressure of a process fluid, comprising: a sensor body having a sensor cavity formed therein having a cavity profile; and a diaphragm in the sensor cavity configured to deflect in response to an applied differential pressure, the diaphragm having a diaphragm profile wherein a gap between the cavity profile and the diaphragm profile changes as a function of the differential pressure; wherein at least one of the cavity profile and diaphragm profile changes as a function of a line pressure, wherein the at least one of the cavity profile and diaphragm profile changes to compensate for changes in the gap due to radial deformation of the sensor body due to the line pressure and thereby reduce errors in differential pressure measurements due to the line pressure.

2. The differential pressure sensor of claim 1, wherein the sensor body includes a sensor body deformation cavity which deforms in response to the line pressure.

3. The differential pressure sensor of claim 2, including at least one vent port which couples to the sensor body deformation cavity.

4. The differential pressure sensor of claim 2, wherein the sensor body deformation cavity is annular.

5. The differential pressure sensor of claim 2, including a second sensor body deformation cavity.

6. The differential pressure sensor of claim 1, wherein the diaphragm includes a diaphragm deformation cavity which deforms in response to the line pressure.

7. The differential pressure sensor of claim 6, wherein the diaphragm deformation cavity is annular.

8. The differential pressure sensor of claim 6, including at least one vent port which couples to the diaphragm deformation cavity.

9. The differential pressure sensor of claim 1, including at least one capacitor electrode carried on the cavity profile.

10. The differential pressure sensor of claim 9, including measuring the differential pressure based upon a capacitance formed between at least one capacitor electrode and the diaphragm.

11. The differential pressure sensor of claim 1, including at least two annular capacitor plate electrodes carried on the sensor body profile.

12. The differential pressure sensor of claim 2, wherein the sensor body deformation cavity is larger in a radial direction.

13. The differential pressure sensor of claim 6, wherein the diaphragm deformation cavity is larger in a radial direction.

14. The differential pressure sensor of claim 1, wherein the diaphragm is fabricated of metal.

15. The differential pressure sensor of claim 1, wherein the diaphragm is fabricated of a ceramic.

16. The differential pressure sensor of claim 1, wherein the sensor body is fabricated of metal.

17. The differential pressure sensor of claim 1, wherein the sensor body is fabricated of an insulator.

18. The differential pressure sensor of claim 1, wherein the sensor body is fabricated of a metal and an insulator.

19. A method of sensing a differential pressure of a process fluid, comprising:
   applying a first and second process pressure to a sensor body, the sensor body having a sensor cavity formed therein with a cavity profile;
   placing a diaphragm in the sensor cavity of the sensor body configured to deflect in response to a pressure difference between the first applied pressure and the second applied pressure, the diaphragm having a diaphragm profile which forms a gap between the cavity profile and the diaphragm profile and wherein deflection of the diaphragm causes the gap to change as a function of the pressure difference;
   compensating for differential pressure measurement inaccuracies due to a line pressure applied to the sensor body by changing at least one of the cavity profile and diaphragm profile as a function of the line pressure, and thereby reduce errors in differential pressure measurements due to the line pressure; and
   measuring differential pressure based upon deflection of the diaphragm within the sensor body.

20. The method of claim 19, including forming a sensory body deformation cavity in the sensor body.

21. The method of claim 19, including forming a diaphragm deformation cavity in the diaphragm.

* * * * *